(12) United States Patent  (10) Patent No.: US 8,737,433 B2
Lee et al.  (45) Date of Patent: May 27, 2014

(54) METHOD FOR SYNCHRONIZING CLOCKS IN A COMMUNICATION SYSTEM

(75) Inventors: Hoo-Sung Lee, Daejeon-si (KR); Woo-Yong Lee, Daejeon-si (KR); Hyun-Kyu Chung, Daejeon-si (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 96 days.

(21) Appl. No.: 13/516,232

(22) PCT Filed: Dec. 15, 2010

(86) PCT No.: PCT/KR2010/008966
§ 371 (c)(1),
(2), (4) Date: Jun. 14, 2012

(87) PCT Pub. No.: WO2011/074869
PCT Pub. Date: Jun. 23, 2011

(65) Prior Publication Data
US 2012/0257642 A1  Oct. 11, 2012

(30) Foreign Application Priority Data
Dec. 15, 2009 (KR) .................. 10-2009-0124773

(51) Int. Cl.
*H04J 3/06* (2006.01)
(52) U.S. Cl.
USPC ..................... 370/503; 370/469; 370/350

(58) Field of Classification Search
CPC ..... H04J 3/0685; H04J 3/0658; H04J 3/0638; H04N 21/2368; H04N 21/8547; H04N 21/4341; H04N 21/4305
USPC .......... 370/503, 419, 498, 469, 350; 375/354, 375/376, 240.26
See application file for complete search history.

(56) References Cited

U.S. PATENT DOCUMENTS

| | | | |
|---|---|---|---|
| 7,236,502 B2 * | 6/2007 | Del Prado Pavon et al. | 370/500 |
| 7,409,022 B2 * | 8/2008 | Dai et al. | 375/354 |
| 7,684,568 B2 | 3/2010 | Yonge, III et al. | |
| 7,855,933 B2 | 12/2010 | Song et al. | |
| 8,503,596 B2 * | 8/2013 | Sheets | 375/376 |
| 2006/0126671 A1 * | 6/2006 | Park et al. | 370/503 |
| 2006/0256909 A1 * | 11/2006 | On et al. | 375/376 |

FOREIGN PATENT DOCUMENTS

| | | |
|---|---|---|
| KR | 2005-0046032 A | 5/2005 |
| KR | 2008-0040732 A | 5/2008 |
| KR | 2009-0105052 A | 10/2009 |

* cited by examiner

*Primary Examiner* — Rasheed Gidado
(74) *Attorney, Agent, or Firm* — Rabin & Berdo, P.C.

(57) ABSTRACT

A method for clock synchronization between higher layers using synchronization information provided from lower layers in multi-clock communication system in which the higher layers and the lower layers use heterogeneous clocks is provided.

12 Claims, 10 Drawing Sheets

METHOD FOR SYNCHRONIZING CLOCKS IN A COMMUNICATION SYSTEM

TECHNICAL FIELD

The present invention relates to a method for higher-layer clock synchronization in a multi-clock communication system, and more particularly, to a method for clock synchronization between higher layers using synchronization information provided from lower layers in a multi-clock communication system in which the higher layers and the lower layers use heterogeneous clocks.

BACKGROUND ART

Recent communication systems have attempted to expand protocols by adding new lower layer protocols while retaining higher layer communication protocols by, for example, designing wireless media access control/physical (MAC/PHY) which is originally for a wired communication, as utilized in a wireless universal serial bus (USB) or wireless 1394, and standardizing alternative MAC/PHY for support of high speed and new radio frequency (RF) bands, as defined in IEEE 802.11(WLAN) and IEEE 802.15(WPAN).

The communication system is not configured by only one protocol, but is evolving by utilizing multiple higher layer protocols and multiple lower layer protocols to constitute one system which chooses a protocol suitable for use in a situation.

Currently used protocols are designed to use own specific base clock, resulting in one system having multiple clock sources. Because most wireless communication protocols require synchronization of clocks used in a lower physical layer for communication, clock synchronization of physical layers has been defined, but a method for synchronization of clocks of higher layers has not been yet defined.

Some applications have no problems in communication if clocks of lower physical layers are synchronized, but other specific applications should perform multi-clock synchronization for higher layer protocols for communication.

FIG. 1 illustrates a diagram of an example of a conventional high definition multimedia interface (HDMI) transmitter, and FIG. 2 illustrates a diagram of an example of a conventional HDMI receiver.

Referring to FIGS. 1 and 2, the HDMI transmitter and the HDMI receiver employ HDMI protocol adaption layer (PAL) specified in ECMA-387, which is standard for wireless high-speed transmission of large multimedia data. The HDMI transmitter and the HDMI receiver utilize HDMI protocol using mm-wave of 60 GHz band to transmit data wirelessly.

In transmission of multimedia data such as video and audio data, if an HDMI source shown in FIG. 1 and an HDMI sink clock of the example illustrated in FIG. 2 are not synchronized with each other, video buffer overflow or underflow occurs in video buffer of a receiving terminal due to clock errors accumulated for a certain period of time, causing damage to data.

In ECMA-387 standard, clock synchronization in units of packets is defined for physical (PHY) layer of each of a transmitter and a receiver in the 60-GHz wireless communication band, and synchronization in units of given periods of time, i.e., superframes, is defined for MAC layer. Furthermore, ECMA-378 standard defines a clock synchronization method for PAL layer.

As a synchronization method for a lower layer such as MAC/PHY layer, an existing stable synchronization method used for other protocols is employed to prevent errors in the synchronization of the lower layer, which may cause communication failure. On the other hand, for clock synchronization of HDMI PALs of a source terminal and a sink terminal, under the assumption that a delay time is inserted between the time of generation of a packet and the time of reception, data to be transmitted from a transmitting terminal PAL to a receiving terminal PAL includes time information about the packet generation time, and the receiving terminal PAL compares the time information included in the received data with a packet reception time, thereby synchronizing a clock of the receiving terminal to a clock of the transmitting terminal.

However, because clock information storage time differs in the transmitting terminal and the receiving terminal and different delay times are inserted into the packet at each of different lower layers while the packet has passed through the lower layers, synchronization errors grow over time, causing an unstable clock.

In an effort to correct the accumulative errors, a large amount of data is devoted to clock information, and it reduces the data efficiency. In addition, an error that has once occurred is accumulated, resulting in system malfunction or failure.

As such, since different protocols use different clock sources or different synchronization methods and errors in synchronization between the transmitting terminal and the receiving terminal lead to a serious system problem in a multi-clock system in which lower layers and higher layers use heterogeneous clocks, a clock synchronization method is required which is capable of stably maintaining synchronization even when variable delay times are inserted into a packet while passing through different lower layers.

DISCLOSURE

Technical Problem

The present invention provides a method for clock synchronization between higher layers using synchronization information provided from lower layers in a multi-clock communication system in which the lower layers and the higher layers use heterogeneous clocks.

In addition, the present invention provides a method for clock synchronization between a higher layer of the transmitting terminal and a higher layer of the receiving terminal, which allows stably maintaining the synchronization between the higher layers even when variable delay time is inserted through different lower layers in a multi-clock communication system in which the lower layers and the higher layers use heterogeneous clocks.

Technical Solution

The present invention provides a method for clock synchronization between a first communication protocol and a second communication protocol, each of the first communication protocol and the second communication protocol comprising a protocol adaptation layer (PAL) as a higher layer and a media access control/physical (MAC/PHY) layer as a lower layer, the method including: transmitting information from the PALs to the MAC/PHY layers for communication between the first communication protocol and the second communication protocol wherein the information is required for establishing a connection between the MAC/PHY layers; establishing a connection between the MAC/PHY layers using the transmitted information and achieving synchronization between the MAC/PHY layers; transmitting a synchronization signal from the synchronized MAC/PHY layers to each of the PALs based on the information required for establishing the connection, and storing, at each of the PALs, synchronization information at the time of receiving the synchronization signal; and transmitting synchronization information of the PAL of the first communication protocol to the PAL of the second communication protocol, and adjusting a clock of the PAL of the second communication protocol by comparing the transferred synchronization information with synchronization information of the PAL of the second communication protocol.

The transmitting of the information to the MAC/PHY layers may include transmitting the information that is required for establishing a connection and includes time information about timing of providing synchronization information from the MAC/PHY layers to the PALs.

At each of the PALs, the storing of the synchronization information at the time of receiving the synchronization signal may include transmitting the synchronization signal from the synchronized MAC/PHY layers to each of the PALs based on the time information about timing of providing synchronization information and storing, at each of the PALs, the synchronization information of own PAL upon receiving the synchronization signal.

The method may further include, in response to completion of synchronization between the PAL of the first communication protocol and the PAL of the second communication protocol, performing data communication between the communication protocols.

While the data communication is being performed between the communication protocols, the synchronization between the PALs may be maintained by repeating the achieving of synchronization, the storing, at each of the PALs, of the synchronization information at the time of receiving the synchronization signal, and the adjusting of the clock of the PAL of the second communication protocol.

The present invention further provides a method for clock synchronization between higher layers using synchronization information of lower layers in a multimedia transmission/reception system that comprises a transmitting device and a receiving device, the method including: setting, at a protocol adaption layer (PAL) of each of the transmitting device and the receiving device, information required for connection between media access control/physical (MAC/PHY) layers as lower layers; connecting the MAC/PHY layers using the information required for connection, and achieving beacon period start time (BPST) synchronization by transmitting and receiving a beacon including a superframe; transmitting a synchronization signal to each of the PALs from the synchronized MAC/PHY layers based on the information required for connection, and storing, at each of the PAL, synchronization information at the time of receiving the BPST synchronization signal; and transmitting the synchronization information stored in the PAL of the transmitting device to the PAL of the receiving device, and adjusting a clock of the PAL of the receiving device by comparing the received synchronization information with the synchronization information of the PAL of the receiving device.

The setting of the information required for connection includes setting the information that is required for connection and includes an address of an opposite device.

The achieving of the BPST synchronization may include generating a superframe that includes a beacon period which varies with the number of devices participating in communication, and achieving the BPST synchronization by transmitting and receiving the beacon including the generated superframe between the transmitting device and the receiving device.

The storing of the synchronization information may include transmitting the synchronization signal to each of the PALs from the synchronized MAC/PHY layers at each BPST time, and storing, at each of the PALs, own clock count value at the time of receiving the BPST synchronization signal as the synchronization information.

The clock of the PAL of the receiving device may be adjusted by transmitting the synchronization information stored in the PAL of the transmitting device to the PAL of the receiving device, and comparing a clock count value of the transmitted synchronization information as a reference value with the clock count value of the synchronization information of the PAL of the receiving device.

The method may further include, in response to completion of synchronization between the PAL of the transmitting device and the PAL of the receiving device, performing multimedia data transfer from the transmitting device to the receiving device.

The present invention further provides an apparatus for reproducing a clock for clock synchronization in a multimedia transmission/reception system, the apparatus including: a clock counter unit configured to store a clock count value at the time of receiving a beacon period start time (BPST) synchronization signal; a voltage control oscillating unit configured to generate a clock for multimedia data communication; and a control unit configured to control the voltage control oscillating unit by comparing a received clock count value with the stored clock count value.

The clock counter unit may be further configured to receive the BPST synchronization signal from a lower layer, store the clock count value at the time of receiving the BPST synchronization signal and transmit the clock count value to the control unit.

The control unit may be further configured to, in response to receiving the BPST synchronization signal from the lower layer, fix a parameter for control of the voltage control oscillating unit and, in response to receiving a clock count value from an external device to communicate over the multimedia transmission/reception system, calculate a parameter for adjusting a clock count value transmitted from the clock counter unit to be matched with the received clock count value at the next synchronization.

The voltage control oscillating unit may be further configured to reproduce a clock based on adjustment using the calculated parameter and output the reproduced clock.

Additional features of the invention will be set forth in the description which follows, and in part will be apparent from the description, or may be learned by practice of the invention.

Advantageous Effects

In a multi-clock communication system in which lower layers and higher layers use heterogeneous clocks, heterogeneous clocks of the higher layers are synchronized using synchronization information provided from the lower layers, and thus the synchronization that is essential for the higher layers can be easily maintained between the higher layers.

Additionally, synchronization information of each higher layer is stored at the same time based on the synchronization information of the lower layer, such as beacon period start time (BPST), and thus errors caused by inconsistent synchronization timing are reduced and the amount of synchronization information to be transmitted for the higher-layer synchronization is also reduced, thereby increasing data transfer efficiency.

Moreover, because at each synchronization procedure, errors are corrected along with synchronization errors of a previous procedure, no errors are accumulated, thereby increasing the stability of the system in use for a long time.

Furthermore, in a multi-clock communication system in which lower layers and higher layers use heterogeneous clocks, a transmitting terminal and a receiving terminal store clock information at a specific time, and thus even when variable delay time is inserted through different lower layers, a stable clock having low jitter can be reproduced and synchronization can be stably maintained between the higher layers.

DESCRIPTION OF DRAWINGS

The accompanying drawings, which are included to provide a further understanding of the invention and are incorporated in and constitute a part of this specification, illustrate embodiments of the invention, and together with the description serve to explain the principles of the invention.

MODE FOR INVENTION

Figure 1:
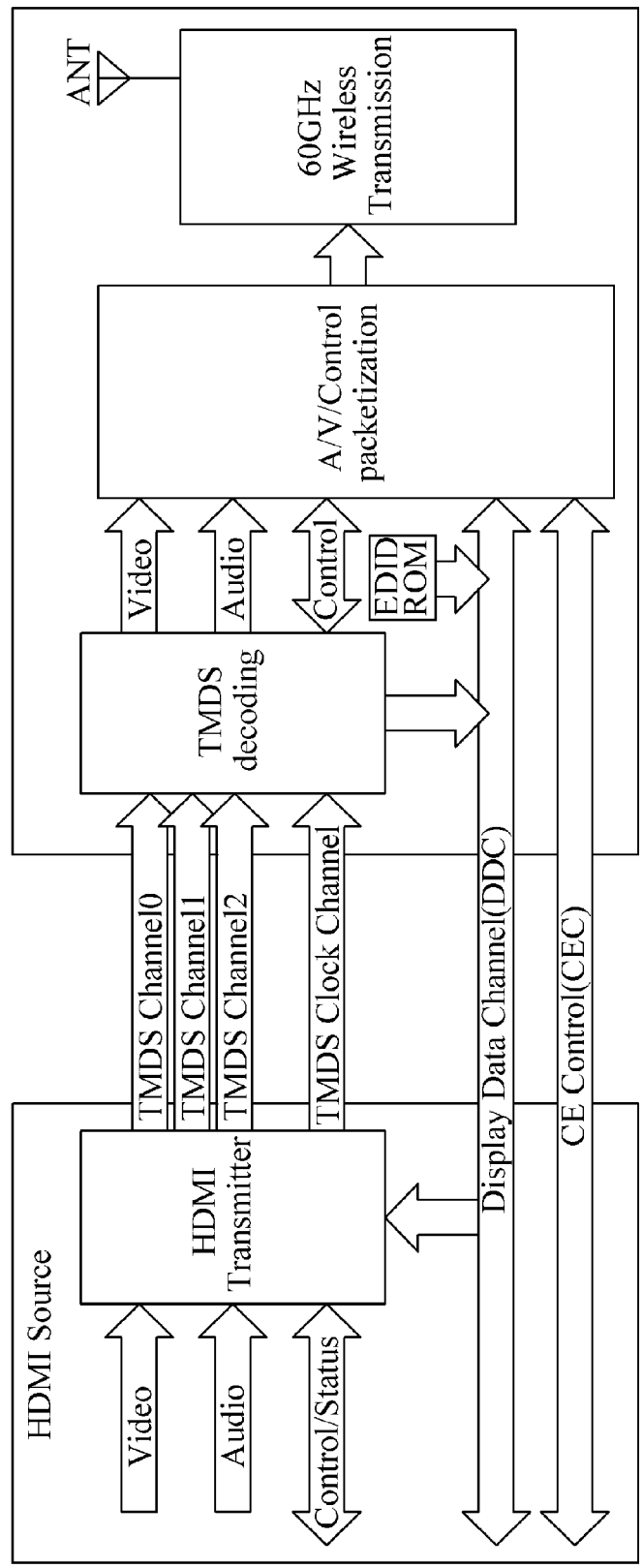
FIG. 1 is a diagram illustrating an example of a conventional wireless high definition multimedia interface (HDMI) transmitter.
Figure 2:
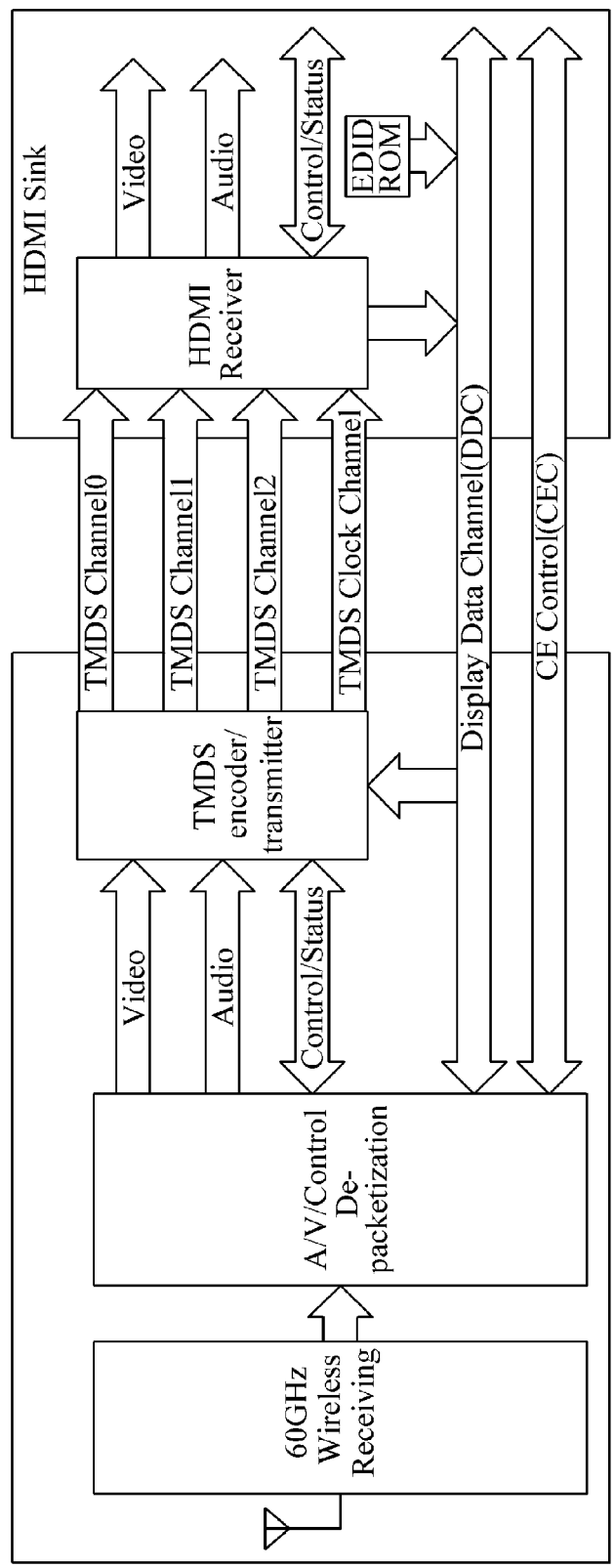
FIG. 2 is a diagram illustrating an example of a conventional wireless HDMI receiver.

The invention is described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Figure 3:
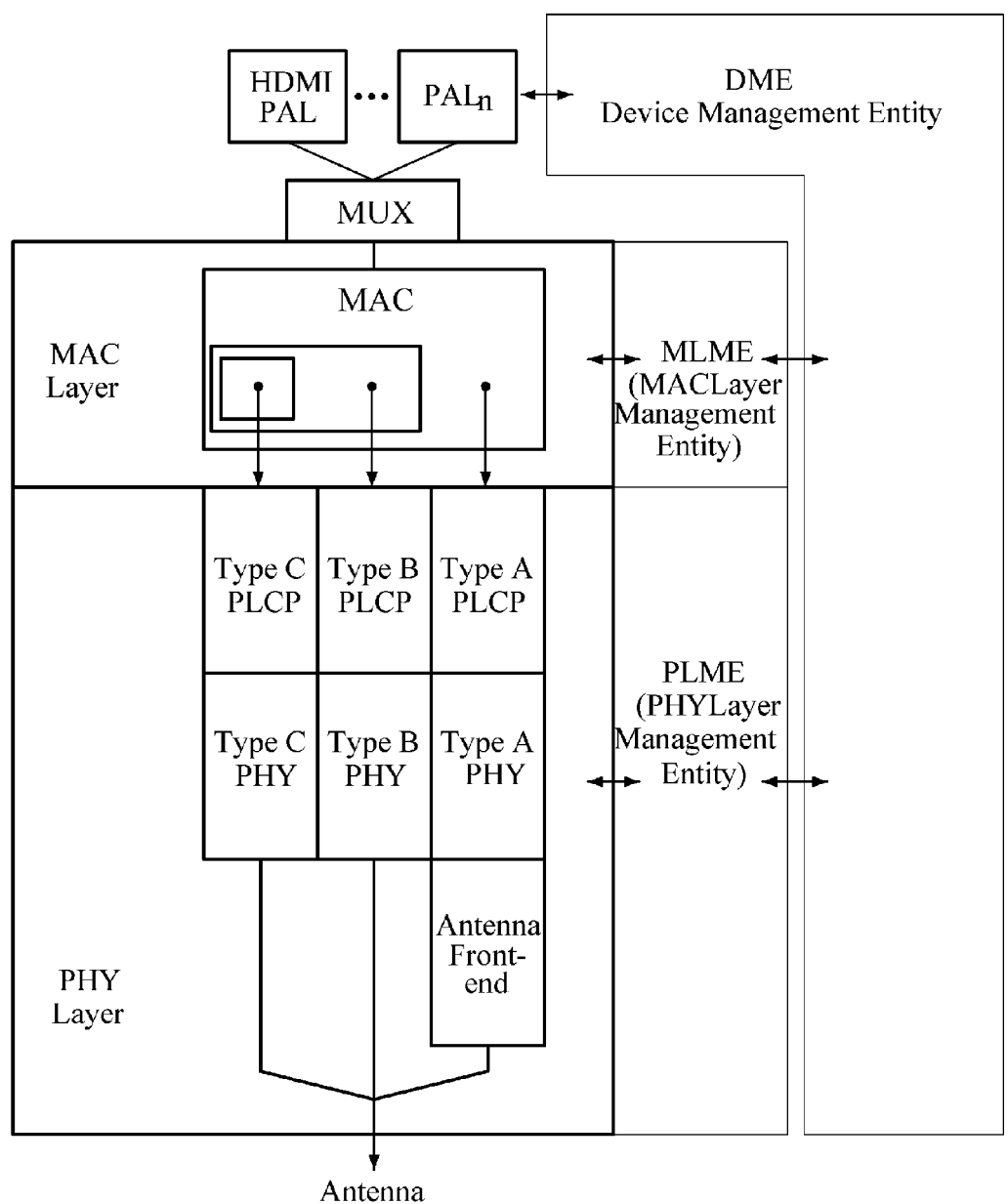
FIG. 3 is a diagram illustrating a protocol structure supporting a high data rate in a radio frequency (RF) band according to an exemplary embodiment of the present invention.

FIG. 3 illustrates a diagram of a protocol structure supporting a high data rate in a radio frequency (RF) band according to an exemplary embodiment of the present invention.

The protocol structure illustrated in FIG. 3 is the same as ECMA 387, and allows an MAC/PHY layer to support existing higher-layer protocol via a protocol virtualization layer, i.e., protocol adaptation layer (PAL), without additionally defining higher-layer protocol wherein the MAC/PHY layer supports a high-speed data rate in a new RF band.

As shown in FIG. 3, the protocol structure according to the exemplary embodiment may include PAL, a MAC layer, and a PHY layer. Detailed operation of the protocol structure will be described below.

Figure 4:
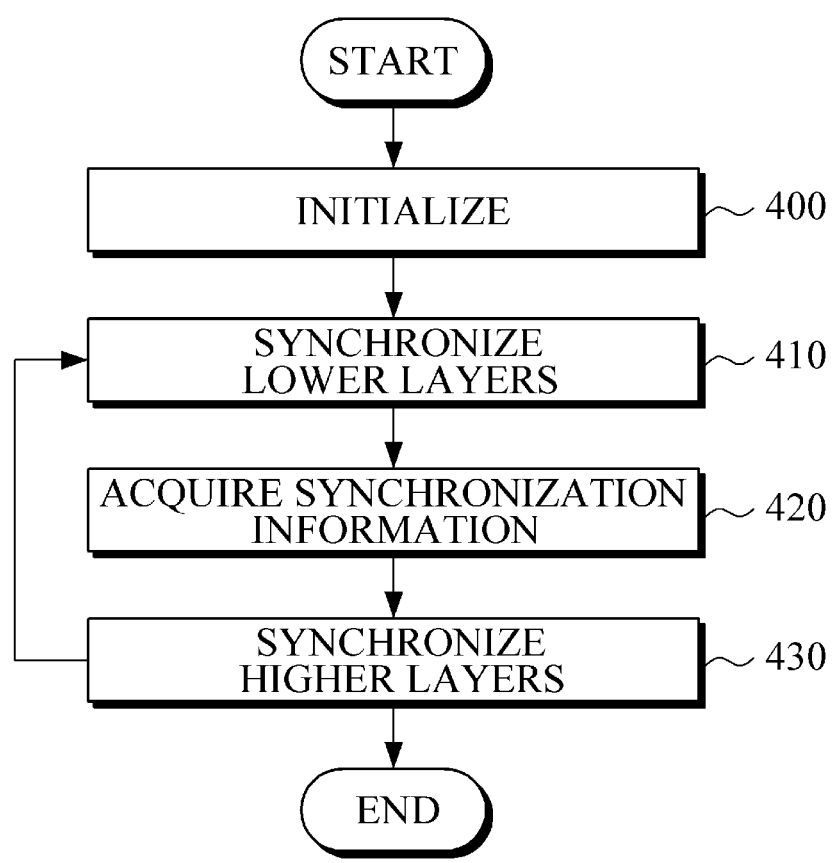
FIG. 4 is a flowchart depicting a method for clock synchronization in a multi-clock communication system according to an exemplary embodiment of the present invention.

FIG. 4 illustrates a flowchart depicting a method for clock synchronization in a multi-clock communication system according to an exemplary embodiment of the present invention.

Referring to FIG. 4, the method according to the exemplary embodiment includes initialization (operation 400), lower layer synchronization (operation 410), synchronization information acquisition (operation 420), and higher layer synchronization (operation 430).

Figure 5:
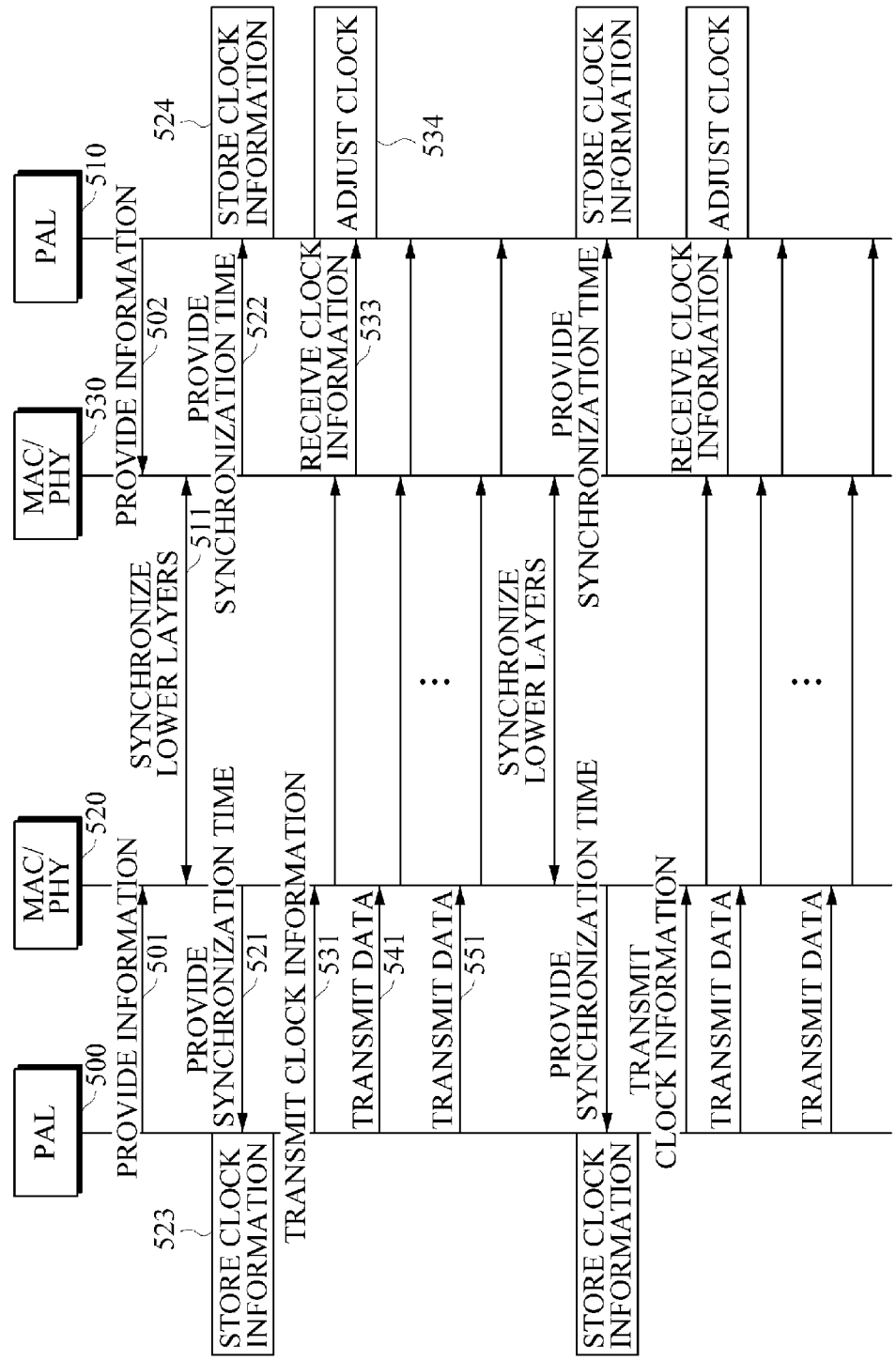
FIG. 5 is a diagram showing messages being transmitted and received in each step for clock synchronization in a multi-clock communication system.

FIG. 5 illustrates a diagram showing messages being transmitted and received in each step for clock synchronization in a multi-clock communication system. Referring to FIG. 5, the messages are transmitted and received between PALs and MAC/PHY in each operation for clock synchronization as shown in FIG. 4.

At initialization in operation 400 of FIG. 4, PALs 500 and 510 provide, respectively, MAC/PHY 520 and 530 with information required for establishing connection therebetween and time information about timing of providing synchronization information (operations 501 and 502).

Thereafter, at lower layer synchronization in operation 410, a connection is established based on the information which has been provided in operation 400, and lower-layer synchronization is performed (operation 511).

At synchronization information acquisition in operation 420, when a predefined time arrives as informed by the time information about the timing of providing the synchronization information that has been provided in operation 400, each of the MAC/PHY 520 and 530 transmits a synchronization signal to a higher layer to inform of the synchronization time (operations 521 and 522).

Each of PALs 500 and 510 at the higher layers, each of which has received the synchronization signal, stores synchronization information of its own at the time of receiving the synchronization signals (operations 523 and 524).

At higher layer synchronization in operation 430 shown in FIG. 4, the higher layer PAL 500 transmits to the opposite PAL 510 through the lower layer with own synchronization information that has been obtained as a reference for higher layer synchronization in operation 420 (operations 531 and 532). The higher-layer PAL 510 receives the synchronization information from the higher layer PAL 500 (operation 533), and compares its own synchronization information that has been obtained in operation 420 with the received synchronization information in an effort to finely adjust clocks of its own PAL 510 (operation 534), and thereby the synchronization is completed.

In response to the completion of the synchronization, the higher layer PAL 500 transmits data to the higher layer PAL 510 (operations 541 and 551), thereby functioning as a communication system.

In addition, the lower layer synchronization operation (operation 410), the synchronization information acquisition operation (operation 420), and the higher layer synchronization operation (operation 430) are periodically repeated, so that the higher layer synchronization can be maintained.

Figure 6:
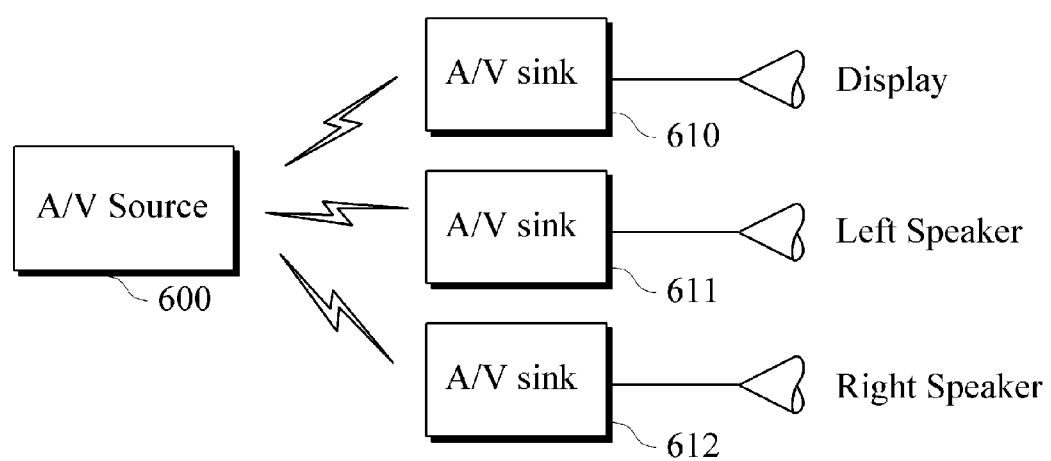
FIG. 6 is a diagram illustrating an example of a multimedia transmission/reception system according to an exemplary embodiment of the present invention.

FIG. 6 illustrates a diagram of an example of a multimedia transmission/reception system according to an exemplary embodiment of the present invention.

Figure 7:
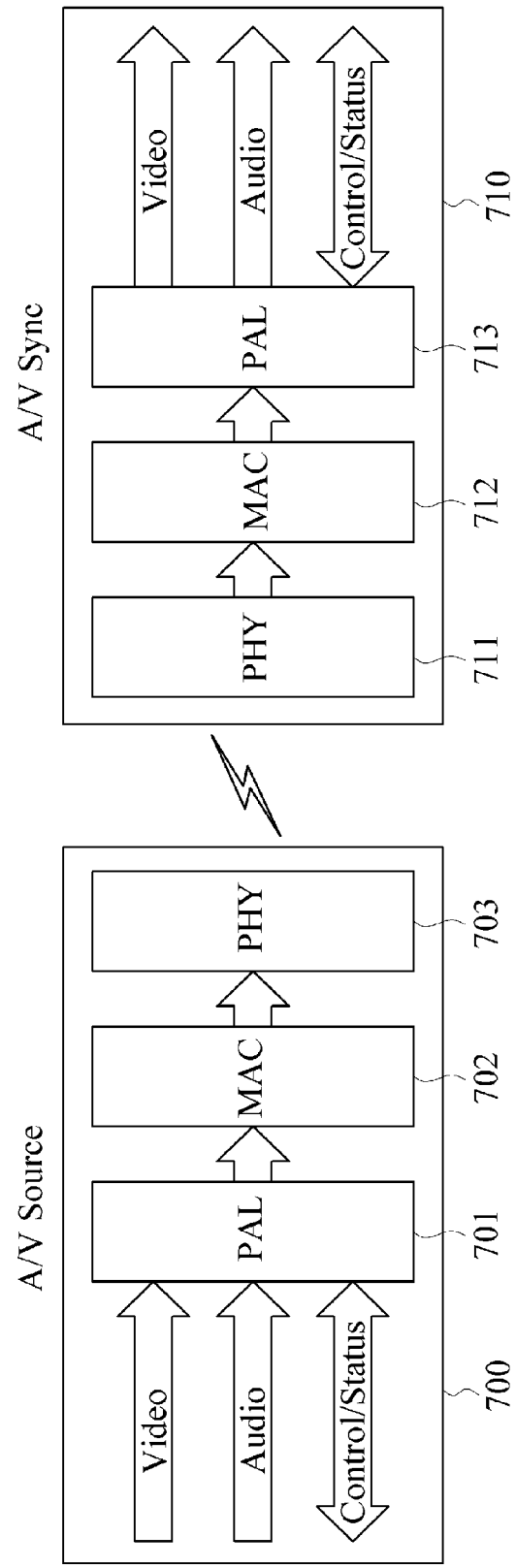
FIG. 7 is a diagram illustrating an example showing in detail a multimedia transmission/reception system according to another exemplary embodiment of the present invention.

FIG. 7 illustrates a diagram of an example showing in detail a multimedia transmission/reception system according to another exemplary embodiment of the present invention.

The examples illustrated in FIGS. 6 and 7 show the multimedia transmission/reception system of a communication system to which the present invention is applied. Referring to FIG. 6, the multimedia transmission/reception system may include an audio/video (A/V) source unit 600 and A/V sink units 610, 611, and 612. The A/V source unit 600 (or 700 in FIG. 7) may receive data and transmit the multimedia data in a wireless or wired manner, and the A/V sink units 610, 611, and 612 (710 in FIG. 7) may classify received multimedia according to properties of the multimedia data, and each of the A/V sink units 610, 611, and 612 (710 in FIG. 7) may output the classified multimedia data. Referring to FIG. 7, the A/V source unit 700 may include PAL 701, MAC 702, and PHY 703, and the A/V sink unit 710 may also include PAL 711, MAC 712, and PHY 713.

Referring to FIGS. 6 and 7, there may a plurality of the A/V source unit 600 and 700 and the A/V sink units 610, 611, 612, and 710, and all devices need to be synchronized to each other with reference to a clock of one A/V source unit (or device) 700.

The example described herein is under the assumption of a multiple-clock communication system in which the higher layer and the lower layer use heterogeneous clocks, and the clocks for the lower layer and for the higher layer may be described as blow.

In the case of ECMA 387 as the multimedia transmission/reception system, a base clock of 27 MHz is multiplied to be used as system clocks for the lower layers (MAC, PHY), and the system clocks are synchronized to each other between the communicating layers through lower layer synchronization. System clocks for the higher layer (e.g., protocol adaptation layer: PAL) may be input along with an image to the A/V source device, whereas the A/V sink device may reproduce the clock of the A/V source device to use through higher clock synchronization.

In the exemplary embodiment, each of the PALs 701 and 711 as protocol virtualization layers belongs to a higher layer, receives multimedia data, such as video, audio, and control signals in the format of a particular protocol, and packetizes the multimedia data into an input format of MAC to send the packetized data to the MAC 702 which is belonging to a lower layer, or splits packets received from the MAC 712 to reproduce video, audio, control, and clock signals in a manner that is suitable for an external interface format.

Figure 8:
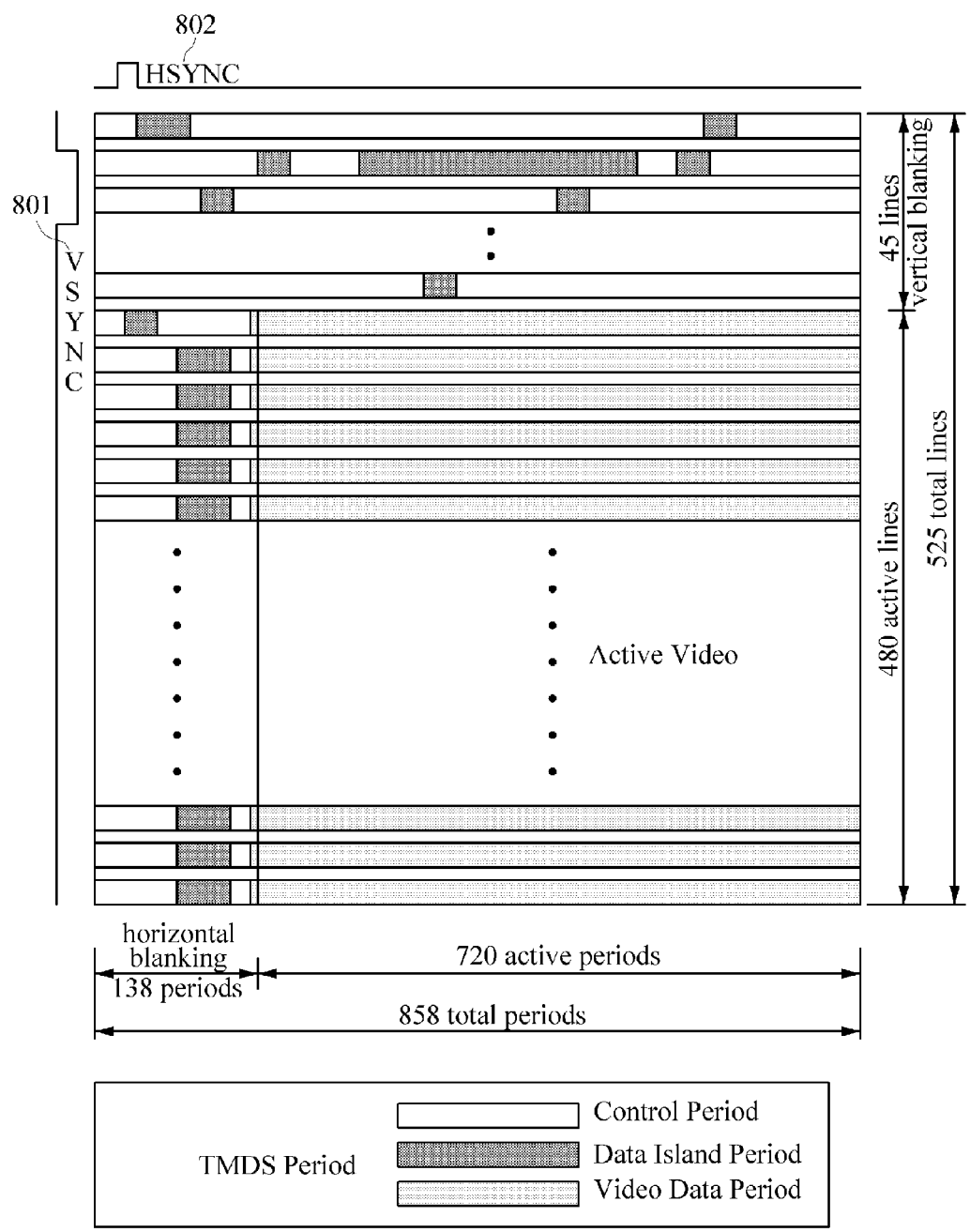
FIG. 8 is a diagram illustrating an example of a protocol adaptation layer (PAL) protocol data format according to an exemplary embodiment of the present invention.

FIG. 8 illustrates a diagram of an example of a PAL protocol data format according to an exemplary embodiment of the present invention. The example illustrated in FIG. 8 shows a part of HDMI PAL data format.

The start of a display is indicated by VSYNC 801, and the start of a line is signified by HSYNC 802. At the start of one display, vertical blanking section exists for given line periods, and at the start of one line, horizontal blanking section exists for certain pixel periods.

During the vertical blanking section and the horizontal blanking section, control data or audio data other than video data is transmitted.

Figure 9:
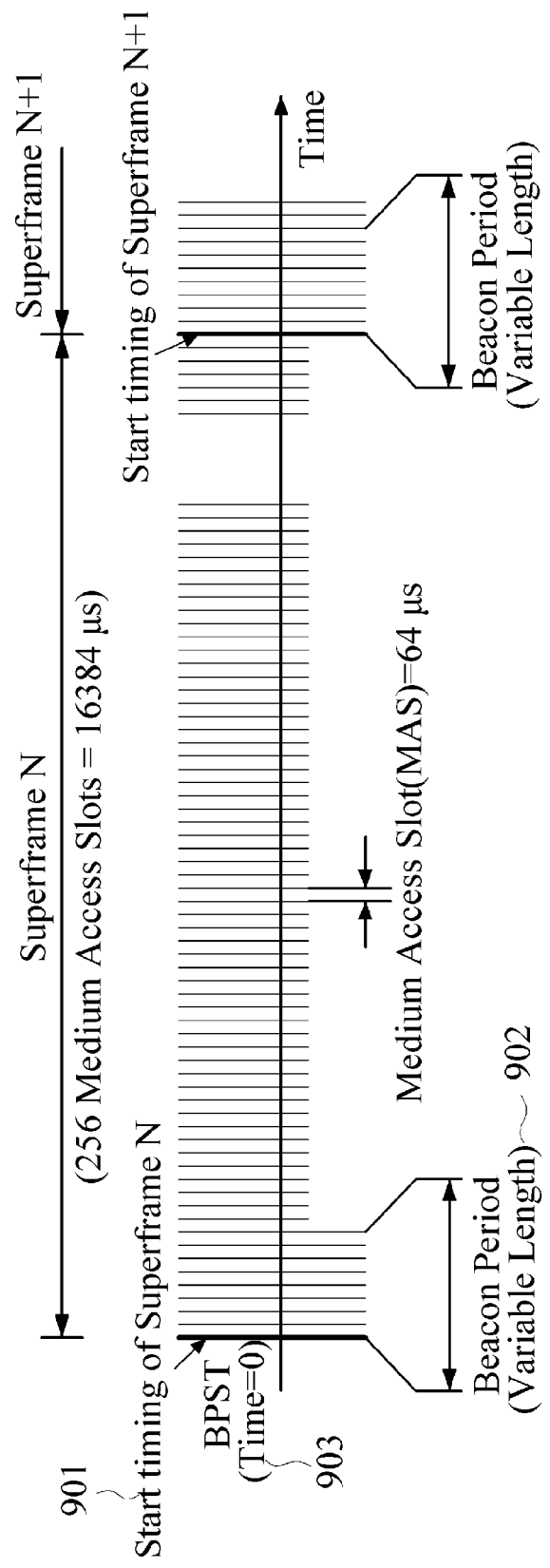
FIG. 9 illustrates a diagram of an example of a media access control (MAC) superframe structure according to an exemplary embodiment of the present invention.

FIG. 9 illustrates a diagram of an example of a MAC superframe structure according to an exemplary embodiment of the present invention. The MAC superframe structure shown in FIG. 9 is used in the communication system according to the exemplary embodiment of the present invention.

In the example shown in FIG. 9, MAC and PHY are belonging to a lower layer, and the MAC maintains synchronization with an opposite MAC that communicates with the MAC, and controls transmission/reception timing based on the superframe, and the PHY performs data transmission/reception.

As shown in the example illustrated in FIG. 9, the superframe is repeated at intervals of 16384 μs and start timing 901 of the superframe has a beacon period that varies with the number of devices that participate in communications.

A beacon period start time (PBST) 903 of the beacon period 902 indicates start timing of the superframe. During the beacon period 902, the MAC maintains synchronization for the BPST 903 as the start timing of the superframe by beacon transmission/reception with the opposite MAC.

In the above example, it is assumed that synchronization timing for the BPST is used as lower-layer synchronization timing. However, the aspect of the present invention is not limited thereto.

Hereinafter, under the aforementioned assumption, a method of synchronizing clocks for a higher layer by use of synchronization information provided from a lower layer in a multi-clock communication system will be described according to the clock synchronization method shown in the example illustrated in FIG. 4, wherein each operation of the method is applied to the multimedia transmission/reception system shown in the examples illustrated in FIGS. 6 and 7.

At initialization in operation 400, the PALs 701 and 713 in a higher layer set information in the MAC/PHY 702 and 712 in lower layers, and the information may be a device address, service information or the like, which is required for connection with the opposite device. Then, the PALs 701 and 713 make settings for the MAC/PHY 702 and 712 to send a synchronization signal to each other at each time of BPST synchronization once the connection and the BPST synchronization have been completed.

Thereafter, at lower-layer synchronization in operation 410, the lower layers may establish a mutual connection via discovery process to find an opposite lower layer based on the information set at the initialization in operation 400. At this time, a superframe shown in the example illustrated in FIG. 9 is generated, and beacons are transmitted and received to achieve synchronization for BPST 903.

Then, at synchronization information acquisition in operation 420, the lower layers that have been completely synchronized with respect to the BPST 903 notify the higher layer of the synchronization time by sending a synchronization signal at each BPST time based on the time information about the timing of providing synchronization information which has been received in the initialization operation 400. Each of the higher-layer PALs 701 and 713 which has received the synchronization signal with respect to the BPST 903 stores own clock count value at the time of receiving the synchronization signal as the synchronization information.

The information about the timing of providing synchronization information may be provided upon initialization or at a prearranged time.

At higher-layer synchronization in operation 430, the PAL 701 of the A/V source device 700 transmits its own clock information stored in operation 420 to the opposite higher-layer PAL 713 through the lower layer.

The clock information may be transmitted via an individual control frame or may be included in a header of data to be transmitted.

The PAL 713 of the A/V sink device 710 receives the clock information at the BPST 903 time from the PAL 701 of the A/V source device 700, compares its own clock information that has been stored in operation 420 with the received clock information, and finely adjusts a reproduction clock of own PAL 713, thereby maintaining the higher clock synchronization.

Figure 10:
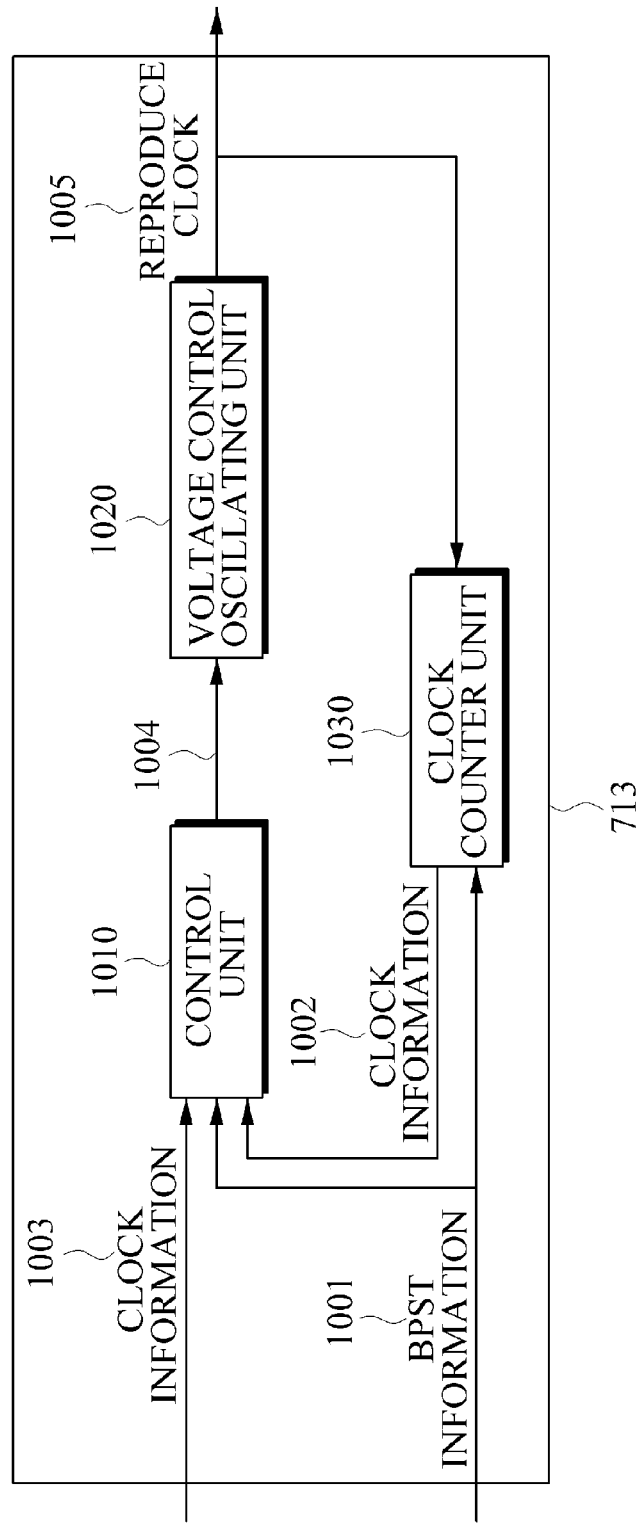
FIG. 10 is a diagram illustrating an example of an apparatus for reproducing a clock in a multimedia transmission/reception system according to an exemplary embodiment of the present invention.

FIG. 10 illustrates a diagram of an example of an apparatus for reproducing a clock in a multimedia transmission/reception system according to an exemplary embodiment of the present invention. Referring to FIG. 10, the apparatus may include a control unit 1010, a voltage control oscillating unit 1020, and a clock counter unit 1030.

The apparatus may be a part of PAL of an A/V sink device, and may include a configuration of the PAL 713 for reproducing a clock which is included in the A/V sink devices 610, 611, and 612 shown in FIG. 6 or the A/V sink device 710 shown in FIG. 7.

The clock counter unit 1030 may receive a BPST signal from MAC of an A/V sink device (operation 1001), store a clock count value at the BPST time, and output information about the clock count value to the control unit 1010 (operation 1002).

In addition, in response to the clock counter unit 1030 receiving the BPST signal, the control unit 1010 fixes a parameter of the voltage control oscillating unit 1020 to a last value (operation 1004), and waits for clock information of the A/V source device.

In response to the reception of the clock information of the A/V source device (operation 1003), the control unit 1010 may compare its own clock information 1002 with the received clock information 1003 to calculate a parameter for control of the voltage control oscillating unit 1020, and control the voltage control oscillating unit 1020 using the calculated parameter to adjust itw own clock (operation 1004).

The voltage control oscillating unit 1020 may reproduce a clock adjusted by the control unit 1010, and output the reproduced signal (operation 1005).

According to the above configuration and procedures, the clock synchronization between the higher-layer PALs in a multimedia transmission/reception system may be realized.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A method for clock synchronization between a first communication protocol and a second communication protocol, each of the first communication protocol and the second communication protocol comprising a protocol adaptation layer (PAL) as a higher layer and a media access control/physical (MACH/PHY) layer as a lower layer, the method comprising using a communication system configured for at least one of wired or wireless transmission to perform operations including:
   transmitting information from the PALs to the MAC/PHY layers for communication between the first communication protocol and the second communication protocol wherein the information is required for establishing a connection between the MAC/PHY layers;
   establishing a connection between the MAC/PHY layers using the transmitted information and achieving synchronization between the MAC/PHY layers;
   transmitting a synchronization signal from the synchronized MAC/PHY layers to each of the PALs based on the information required for establishing the connection, and storing, at each of the PALs, synchronization information at the time of receiving the synchronization signal; and
   transmitting synchronization information of the PAL of the first communication protocol to the PAL of the second communication protocol, and adjusting a clock of the PAL of the second communication protocol by comparing the transferred synchronization information with synchronization information of the PAL of the second communication protocol.

2. The method of claim 1, wherein the transmitting of the information to the MAC/PHY layers comprises transmitting the information that is required for establishing a connection and includes time information about timing of providing synchronization information from the MAC/PHY layers to the PALs.

3. The method of claim 2, wherein, at each of the PALs, the storing of the synchronization information at the time of receiving the synchronization signal comprises transmitting the synchronization signal from the synchronized MAC/PHY layers to each of the PALs based on the time information about timing of providing synchronization information and storing, at each of the PALs, the synchronization information of own PAL upon receiving the synchronization signal.

4. The method of claim 1, further comprising:
   in response to completion of synchronization between the PAL of the first communication protocol and the PAL of the second communication protocol, performing data communication between the communication protocols.

5. The method of claim 4, wherein while the data communication is being performed between the communication protocols, the synchronization between the PALs is maintained by repeating the achieving of synchronization, the storing, at each of the PALs, of the synchronization information at the time of receiving the synchronization signal, and the adjusting of the clock of the PAL of the second communication protocol.

6. A method for clock synchronization between higher layers using synchronization information of lower layers in a multimedia transmission/reception system that comprises a transmitting device and a receiving device, the method comprising:

setting, at a protocol adaption layer (PAL) of each of the transmitting device and the receiving device, information required for connection between media access control/physical (MAC/PHY) layers as lower layers;

connecting the MAC/PHY layers using the information required for connection, and achieving beacon period start time (BPST) synchronization by transmitting and receiving a beacon including a superframe;

transmitting a synchronization signal to each of the PALs from the synchronized MAC/PHY layers based on the information required for connection, and storing, at each of the PAL, synchronization information at the time of receiving the BPST synchronization signal; and transmitting the synchronization information stored in the PAL of the transmitting device to the PAL of the receiving device, and adjusting a clock of the PAL of the receiving device by comparing the received synchronization information with the synchronization information of the PAL of the receiving device;

wherein the achieving of the BPST synchronization comprises generating a superframe that includes a beacon period which varies with a number of devices participating in communication, and achieving the BPST synchronization by transmitting and receiving the beacon including the generated superframe between the transmitting device and the receiving device.

7. The method of claim 6, wherein the setting of the information required for connection comprises setting the information that is required for connection and includes an address of an opposite device.

8. The method of claim 6, wherein the storing of the synchronization information comprises transmitting the synchronization signal to each of the PALs from the synchronized MAC/PHY layers at each BPST time, and storing, at each of the PALs, own clock count value at the time of receiving the BPST synchronization signal as the synchronization information.

9. The method of claim 6, wherein the clock of the PAL of the receiving device is adjusted by transmitting the synchronization information stored in the PAL of the transmitting device to the PAL of the receiving device, and comparing a clock count value of the transmitted synchronization information as a reference value with the clock count value of the synchronization information of the PAL of the receiving device.

10. The method of claim 6, further comprising:

in response to completion of synchronization between the PAL of the transmitting device and the PAL of the receiving device, performing multimedia data transfer from the transmitting device to the receiving device.

11. An apparatus for reproducing a clock for clock synchronization in a multimedia transmission/reception system, the apparatus comprising an audio/video sink device including:

a clock counter unit configured to store a clock count value at a time of receiving a beacon period start time (BPST) synchronization signal;

a voltage control oscillating unit configured to generate a clock for multimedia data communication; and a control unit configured to control the voltage control oscillating unit by comparing a received clock count value with the stored clock count value;

wherein the clock counter unit is further configured to receive the BPST synchronization signal from a lower layer, store the clock count value at the time of receiving the BPST synchronization signal and transmit the clock count value to the control unit; and wherein the control unit is further configured to, in response to receiving the BPST synchronization signal from the lower layer, fix a parameter for control of the voltage control oscillating unit and, in response to receiving a clock count value from an external device to communicate over the multimedia transmission/reception system, calculate a parameter for adjusting a clock count value transmitted from the clock counter unit to be matched with the received clock count value at a next synchronization.

12. The apparatus of claim 11, wherein the voltage control oscillating unit is further configured to reproduce a clock based on adjustment using the calculated parameter and output the reproduced clock.

\* \* \* \* \*